United States Patent [19]

Poe

[11] 4,403,019

[45] Sep. 6, 1983

[54] VENTING SYSTEM FOR ELECTRIC STORAGE BATTERY

[75] Inventor: David T. Poe, Yorktown, Ind.

[73] Assignee: General Motors Corporation, Detroit, Mich.

[21] Appl. No.: 362,749

[22] Filed: Mar. 29, 1982

[51] Int. Cl.$^3$ .............................................. H01M 2/12
[52] U.S. Cl. ........................................ 429/53; 429/82
[58] Field of Search ...................... 429/53, 82, 83, 87, 429/88, 89

[56] References Cited

U.S. PATENT DOCUMENTS

| | | | |
|---|---|---|---|
| 4,002,496 | 1/1977 | Nitta ...................................... | 429/53 |
| 4,031,294 | 6/1977 | Sano ...................................... | 429/82 |
| 4,072,799 | 2/1978 | Leeson et al. ......................... | 429/82 |

Primary Examiner—Charles F. LeFevour
Attorney, Agent, or Firm—Lawrence B. Plant

[57] ABSTRACT

Venting system for an electric storage battery having an electrolyte drainage aperture at the low point in the sloping floor of an electrolyte trapping chamber and including an integrally molded shielding enclosure depending beneath the aperture. The enclosure is defined in part by a flap-like closure wall which is resiliently rooted to the underside of the floor and depends therefrom at such an angle as to underlie the aperture. The resiliently rooted wall permits the wall to be molded beneath the aperture yet deflect out of the way and return (i.e., due to plastic memory) when the mold core is withdrawn.

1 Claim, 7 Drawing Figures

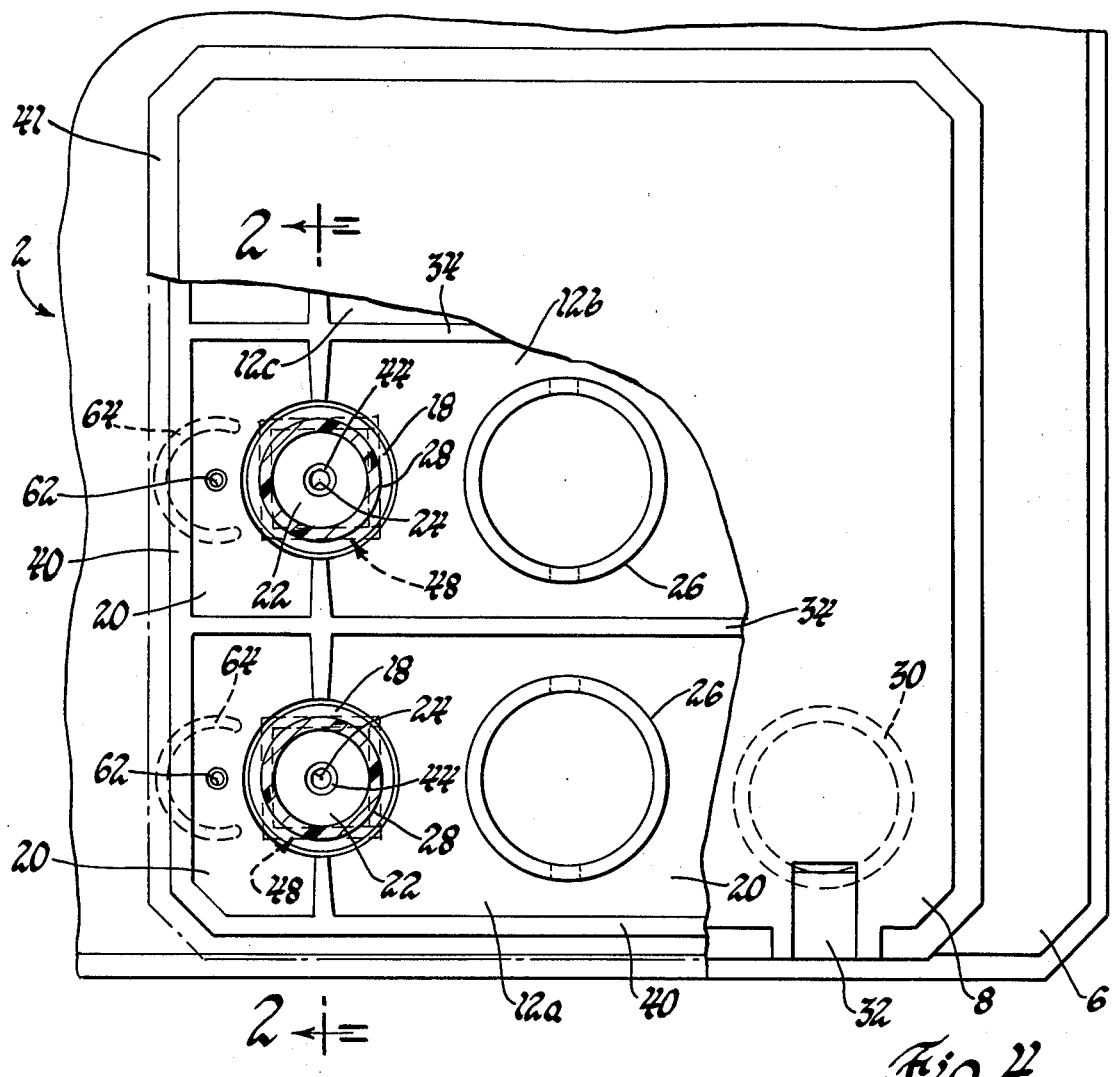
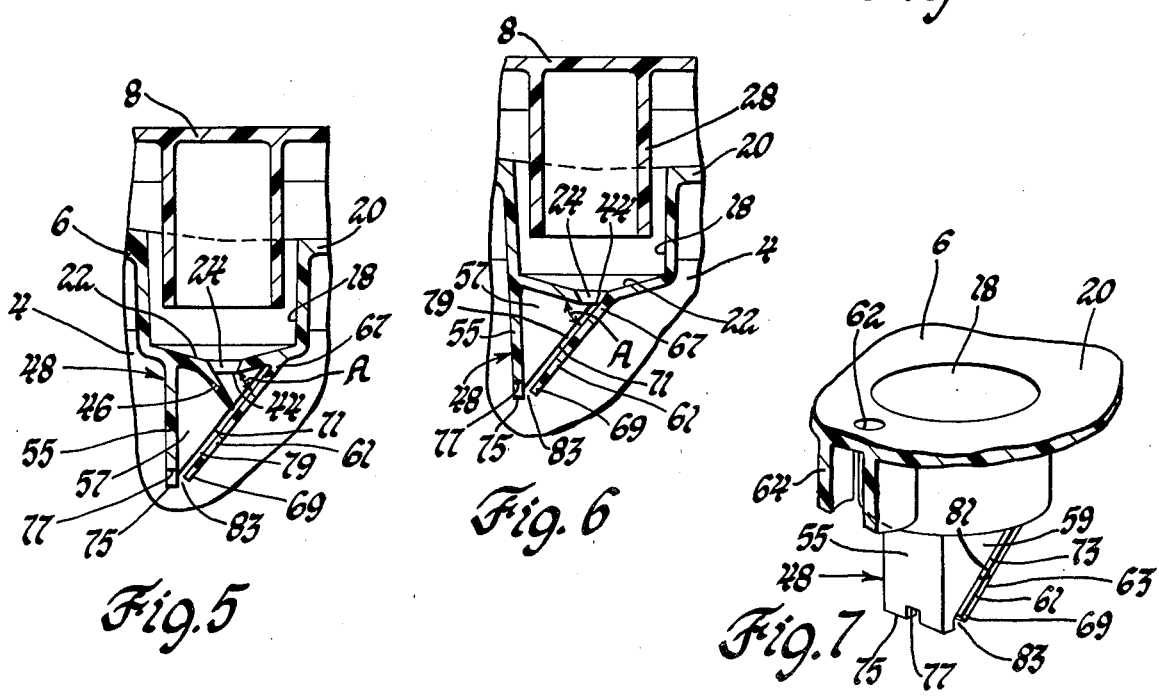
Fig. 4
Fig. 5
Fig. 6
Fig. 7

VENTING SYSTEM FOR ELECTRIC STORAGE BATTERY

This invention relates to electric storage batteries and more specifically to venting systems therefor.

BACKGROUND OF THE INVENTION

Pb-acid storage batteries, among others, generate gases (e.g., $H_2$) within their innards during the normal cycling thereof. These gases are vented to the atmosphere via venting systems designed to permit gas passage while trapping electrolyte which is then drained back into the battery cells from whence it came.

There are two types of battery venting systems commonly in use. These types can be classified as either a vertical type or a horizontal type depending on the orientation of the chamber used to trap the electrolyte. In this regard, both types typically include a chamber intermediate a vent/drainage aperture leading to a cell compartment housing the battery's innards and a gas exhaust port leading to the atmosphere. This chamber traps electrolyte passing through the cell vent/drainage aperture and prevents it from traversing to the exhaust port and escaping the battery. Electrolyte trapped in the trapping chamber drains back into the cell through the same aperture from whence it came.

Discrete vent plugs found on many batteries exemplify vertical type vent systems. The plugs typically include a deep, cylindrical chamber which fits tightly into the filler well of the battery. The floor of the chamber slopes toward a central aperture through which the gases pass upwardly and any electrolyte (e.g., splash) entering the chamber drains back into the cell. The top of the chamber has an exhaust port for discharging the gases to the atmosphere. The chamber may also contain a variety of internal baffles to prevent electrolyte from reaching the exhaust port. Separation of the electrolyte from the gas occurs primarily by gravity as the gases rise through the cylindrical chamber and the heavier electrolyte falls to the chamber floor.

Horizontal type vent systems, on the other hand, are most frequently found molded integrally into the battery cover and include an elongated chamber extending horizontally across the top of the battery. The gases passing through the vent/drainage aperture must traverse the length of the chamber before discharge to the atmosphere via an exhaust port laterally remote from the cell vent/drainage aperture. Frequently such designs employ a single exhaust port and manifold capable of venting several trapping chambers. One such horizontal type system (i.e., the "Freedom Battery" sold by the assignee of the present invention) includes both a shallow vertical cylindrical portion and an elongated horizontal portion in its electrolyte trapping chamber.

Small venting/drainage apertures are usually provided in the floor of the electrolyte trapping chamber to minimize entry of electrolyte splash into the trapping chambers while still permitting the gases to pass. Nonetheless, the trapping chambers are commonly invaded by electrolyte passing up through the venting/drainage aperture as a result of excessive overcharging, sloshing, splashing, etc. (i.e., due to mishandling, vibration, tilting, or the like). Entry of excessive amounts of electrolyte into the trapping chambers of horizontal systems is a particularly acute problem as such electrolyte can more readily traverse a horizontal chamber than a vertical chamber.

It is the principal object of the present invention to provide an enclosure beneath the venting/drainage aperture of a battery venting system to shield the aperture against electrolyte invasion from the innards of the battery. It is a further object of the present invention to provide a readily moldable such enclosure including a resilient closure wall with a plastic memory. These and other objects and advantages of the present invention will become more readily apparent from the description thereof which follows.

SUMMARY OF THE INVENTION

The present invention comprehends a battery venting system having an electrolyte venting/drainage aperture, a gas venting port, and a trapping chamber between the aperture and the port, and includes a shielding enclosure depending beneath the aperture to ward off electrolyte invasion of the aperture from the battery's innards. More specifically, the enclosure comprises a first wall rooted at, and depending substantially vertically from, the underside of the trapping chamber floor on one side of the venting/drainage aperture. The wall may include a small notch in its distal edge (i.e., remote from where the wall is rooted to the floor) to facilitate electrolyte drainage from the enclosure. Two depending lateral walls on opposite sides of the aperture join the first wall along their vertical edges and together therewith enclose the aperture on three sides. The lateral walls each have an angling edge which declines at an actute angle from beneath the floor in the general direction of the distal edge of the first wall. A flap-like closure wall resiliently rooted at the underside of the floor completes the protective enclosure. The closure wall is rooted to the floor approximately along a line drawn between the intersections of the angling edges of the lateral walls and the floor and depends from the floor at about the same acute angle as the angling edges of the lateral walls such as to protectively underlie the aperture. The closure wall extends along substantially the full length of the angling edges, but is spaced therefrom by a gap through which the battery gases are vented. The closure wall terminates in a drip edge which lies proximate the distal edge of the first wall to provide a drainage opening therebetween through which the electrolyte can return to the cell (i.e., with or without the drainage notch in the first wall). While the resiliently rooted, flap-like closure wall assumes the described position during and following molding, it will deflect outwardly (i.e., see the arrow in FIG. 3) as the mold core is withdrawn and then return to its as-molded position due to the memory of the plastic where the closure wall is rooted to the floor.

DETAILED DESCRIPTION OF SPECIFIC EMBODIMENTS

The invention may be better understood when considered in the light of the following detailed description of certain specific embodiments thereof, which description is given in conjunction with the several drawings in which:

FIG. 4 is a partially broken away view taken in the direction 4—4 of FIG. 3;

FIG. 5 is a partial, sectioned view like that of FIG. 3, but of another embodiment of the present invention;

FIG. 6 is a partial, sectioned view like that of FIG. 3, but of still another embodiment of the present invention; and FIG. 7 is an external, perspective view of the enclosure of the present invention.

While the several Figures may depict different embodiments, structure common to all embodiments are designated by the same numerals in all Figures.

Figure 1:
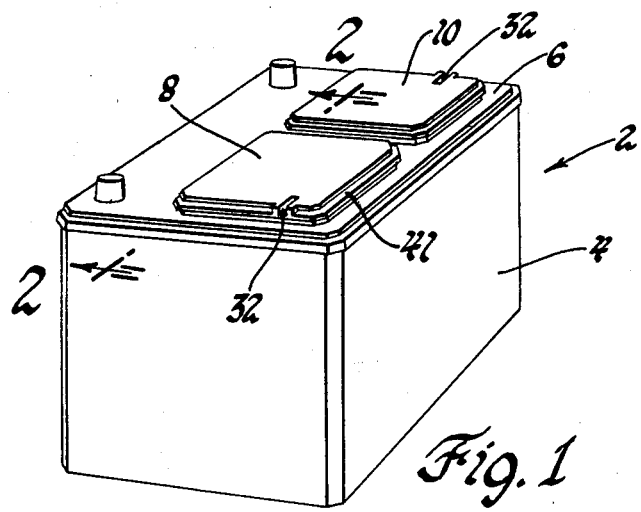
FIG. 1 is a perspective view of a six cell battery having two horizontal type venting systems each servicing three of the battery's cells.
Figure 2:
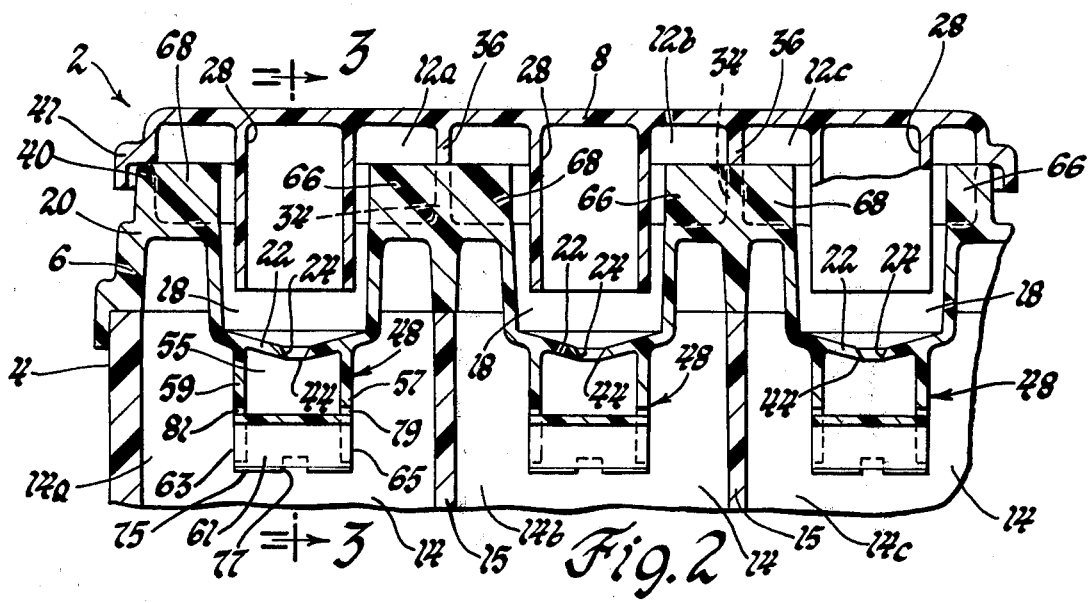
FIG. 2 is a sectioned view in the direction 2—2 of FIGS. 1 and 4.

FIG. 1 illustrates a battery 2 having a case 4, an intermediate cover 6 and two final covers 8 and 10. The case 4 is divided into six cells 14 (see FIG. 2) by means of intercell partitions 15. Each of the final covers 8 and 10 mate with the intermediate cover 6 to house a horizontal type venting system for venting three of the cells 14, as discussed hereafter in more detail. The venting system includes three venting chambers 12a, 12b and 12c, one for each of three successive battery cells 14a, 14b and 14c, respectively. Each of the venting chambers 12a, 12b, 12c includes a horizontally extending portion 16 and a vertically depending well portion 18 formed as part of the intermediate cover 6. The final cover 8 forms a ceiling for each of the chambers 12a, 12b and 12c. An upper wall 20 separates the trapping chambers 12 from the cells 14 and forms the floor of the horizontally extending portion 16 of the chamber. The floor gently slopes toward a vertical well portion 18 of the chamber 12 to direct any electrolyte trapped by the chamber 12 back into the well 18 from whence it came. A lower wall 22 forms the floor of the vertical well portion 18 and, in turn, slopes downwardly toward the vent/drainage aperture 24 through which the battery gases are vented upwardly and electrolyte drained downwardly. Tubular portions 28 depend from the final cover 8 into the vertical well portion 18 for preventing electrolyte splash from entering the horizontal portion 16 of trapping chamber 12.

The intermediate cover 6 also includes electrolyte filler wells 26 which pass through the floor wall 20 for filling the individual cells 14 with electrolyte during assembly. An annular skirt 42 depending from the final cover 8 is heat sealed to the top edge of the filler well 26 to close off each filler well after the cells have been filled. Similarly partitions 36 depend from the final cover 8 and are heat sealed atop the partitions 34 upstanding from the intermediate wall 20 of the cover 6 and together serve to separate the several venting chambers 12a, 12b and 12c one from the other substantially along the full lengths thereof. A small notch 38 near the ends of each depending partition 36, remote from the well 18, communicates the several adjacent chambers 12 one with the other and with a porous flame arrestor 30 located at the far corner of the final cover 8 above the end chamber 12a. The notches 38 serve as the exhaust ports for chambers 12b and 12c. The flame arrestor 30 separates the several chambers 12 from the battery's ambient exhaust port 32 (i.e., where the gases exit to the atmosphere). An upstanding ridge 40 atop the intermediate cover 6 forms the peripheral border of the three contiguous trapping chambers 12a, 12b and 12c and is heat sealed to the peripheral shoulder 41 on the cover 8 to seal off the venting system. There is thus described the aforesaid prior art "Freedom" Battery venting system.

A prism-like shielding enclosure 48 depends from beneath the floor wall 22 of vent well portion 18 so as to prevent electrolyte splash from invading chamber 12 through the aperture 24. The enclosure 48 comprises: a first wall 55 depending vertically from beneath the floor wall 22 on one side of the aperture 24; two generally triangular lateral walls 57 and 59 likewise depending from floor 22 on opposed sides of the aperture 24 and adjoining the first wall 55 at right angles thereto; and a flap-like closure wall 61 depending at an acute angle A from beneath the floor wall 22 so as to underlie the aperture 24. The closure wall 61 is defined by lateral edges 63 and 65, a resilient root edge 67 integral with the wall 22 and a drip edge 69 opposite the root edge 67. The lateral edges 63 and 65 lie adjacent the angling edges 71 and 73 of lateral walls 57 and 59 while the drip edge 69 lies adjacent the distal edge 75 of the first wall 55. A small notch 77 may be provided in the distal edge 77 of the wall 55 to facilitate electrolyte drainage back into the cell 14. The lateral edges 63 and 65 of the closure wall 61 are spaced from the angling edges 71 and 73 of the lateral walls by small gaps 79 and 81 through which the battery gases escape from the cell 14 into the vent system even when the electrolyte level is above the drip edge 69. Similarly the drip edge 69 is spaced from the distal edge 75 by a small gap 83 through which electrolyte flows back to the cell.

A secondary vent opening 62 is provided through the floor wall 20 for much the same purpose as the gaps 79, 81 and 83 and serves to vent gases from the cell while electrolyte is draining back through, and otherwise plugging, the apertue 24. Vent opening 62 is protected from electrolyte splash by depending arcuate baffle 64. Dams 66 and 68, upstanding from the floor of the intermediate cover 6, prevent any electrolyte entering the trapping chamber 12 through opening 62 from traversing the full length thereof to the flame arrestor 30 and serve to direct such electrolyte into the well 18 for ultimate reflux to the battery cells via aperture 24.

Figure 3:
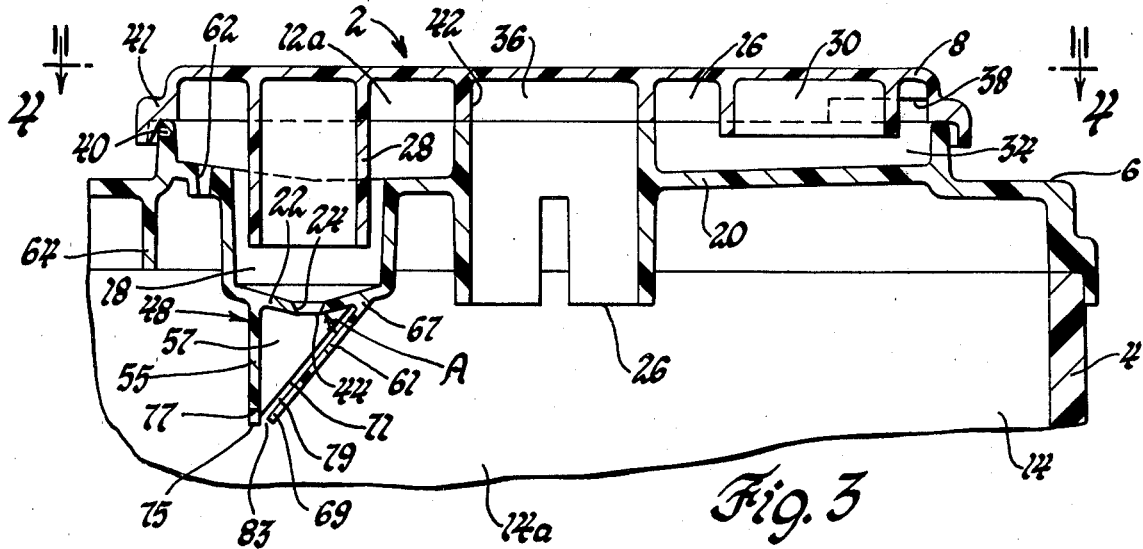
FIG. 3 is a sectioned view taken in the direction 3—3 of FIG. 2.

FIG. 5 depicts an embodiment similar to that of FIG. 3 but with the extra provision of a drip tab 46 which depends from the lower edge of the rim 44 of aperture 24 at an angle of approximately sixty degrees. The drip tab 46 promotes drainage from the floor 22 and further blocks entrance of electrolyte into the aperture 24 essentially as described in my copending U.S. patent application Ser. No. 305,096 filed Sept. 24, 1981 and assigned to the assignee of the present invention.

FIG. 6 depicts an embodiment similar to that of FIG. 3, but with the closure wall 61 depending from the wall 22 precisely at the rim 44 of the aperture 24 to facilitate drainage from the floor 22 according to the teachings of the aforesaid U.S. patent application Ser. No. 305,096.

While this invention has been disclosed primarily in terms of specific embodiments thereof it is not intended to be limited thereto but rather only to the extent set forth hereafter in the claim which follows.

The embodiments of the invention in which an exclusive property or privilege is claimed are defined as follows:

1. In an electric storage battery having a venting system for relieving gases from the innards of the battery including an electrolyte trapping chamber defined in part by a floor sloping toward an electrolyte drainage aperture at the low point of the floor, and means integrally molded to, and depending from, the underside of said floor beneath said aperture for reducing electrolyte invasion of said aperture directly from said innards, said means comprising:
- a first wall depending substantially vertically from the underside of said floor on one side of said aperture, said wall having an upper edge rooted at said floor and a lower distal edge remote from the rooted edge;
- lateral walls rooted at, and depending substantially vertically from, the underside of said floor on opposite sides of said aperture, said lateral walls each having a substantially vertical edge adjoining said first wall and an angling edge declining from said floor at an acute angle toward said distal edge;
- a closure wall resiliently rooted at the underside of said floor on the side of said aperture opposite said one side and extending beneath said aperture, said closure wall being defined by lateral edges each adjacent one of said angling edges and a drip edge adjacent said distal edge, and serving to provide a protective shield between said aperture and said innards to substantially prevent invasion of said aperture by electrolyte splashing within said innards, said resilient rooting being such that said closure wall deflects sufficiently to permit withdrawal of a coring element following molding and return after said elements are withdrawn;
- a drainage opening at said distal and drip edges to permit return of trapped electrolyte to said innards; and
- a gap between said angling edges and said closure wall for relieving said gases from said innards when the electrolyte level therein is above said drainage opening.

* * * * *